United States Patent [19]
Imanaka et al.

[11] Patent Number: 6,057,887
[45] Date of Patent: May 2, 2000

[54] METHOD AND APPARATUS FOR RECEIVING A DTMF SIGNAL AND DISPLAYING A FIGURE BASED UPON COORDINATE DATA OBTAINED FROM THE DTMF SIGNAL

[75] Inventors: Takeshi Imanaka, Nara; Hiroshi Kutsumi; Mitsuteru Kataoka, both of Katano; Satoshi Matsuura, Osaka, all of Japan

[73] Assignee: Matsushita Electric Industrial Co., Ltd., Japan

[21] Appl. No.: 08/864,857

[22] Filed: May 29, 1997

[30] Foreign Application Priority Data

May 30, 1996 [JP] Japan .................................. 8-136213

[51] Int. Cl.⁷ ...................................................... H04N 5/44
[52] U.S. Cl. ................... 348/553; 379/88.11; 379/93.23; 348/564
[58] Field of Search ..................... 348/6, 20, 15, 348/552, 553, 564; 379/88.11, 88.13, 93.23, 102.03, 106.01

[56] References Cited

U.S. PATENT DOCUMENTS

| 5,283,818 | 2/1994 | Klausner et al. . |
| 5,414,457 | 5/1995 | Kadowski et al. ................ 379/93.23 |
| 5,418,560 | 5/1995 | Yasuda ............................... 379/93.23 |
| 5,502,727 | 3/1996 | Catanzaro et al. ..................... 348/552 |
| 5,537,324 | 7/1996 | Nimura .............................. 379/93.23 |
| 5,754,629 | 5/1998 | Kunimori et al. ................... 379/88.11 |
| 5,867,563 | 2/1999 | Kato et al. ......................... 379/88.11 |

FOREIGN PATENT DOCUMENTS

| 0589417 | 3/1994 | European Pat. Off. . |
| 61-201552 | 6/1986 | Japan . |
| 62-013150 | 1/1987 | Japan . |
| 02026463 | 1/1990 | Japan . |
| 5305681 | 6/1995 | Japan . |

*Primary Examiner*—Victor R. Kostak
*Attorney, Agent, or Firm*—Smith, Gambrell & Russell, LLP

[57] ABSTRACT

An information receiving apparatus and method are disclosed. According to such apparatus and method, a DTMF signal is received over a telephone line, and coordinate data corresponding to the received DTMF signal are obtained. A predetermined figure then is displayed in a position based upon the coordinate data.

17 Claims, 20 Drawing Sheets

FIG. 6
(a) MESSAGE
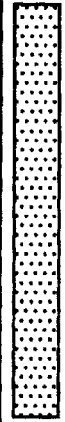
(b) GRAPH
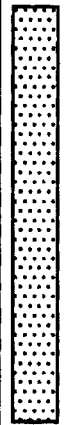
(c) SIMPLE MAP
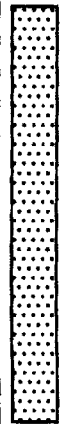

| HANAKO TARO MOM DAD GRANDPA GRANDMA | |
|---|---|
| | COME IMMEDIATELY<br>CALL IMMEDIATELY<br>CHANGE IN CONDITION, CALL<br>CAN'T COME IN TIME<br>VISIT YOU TODAY<br>VISIT YOU TOMORROW } URGENT MESSAGES<br><br>AT FRIEND'S<br>WON'T COME HOME TODAY<br>STAY AT GRANDMA'S } OTHER MESSAGES |

(b)

| HANAKO TARO MOM DAD | |
|---|---|
| | COME IMMEDIATELY<br><br>CALL IMMEDIATELY<br><br>CHANGE IN CONDITION, CALL<br><br>CAN'T COME IN TIME<br>VISIT YOU TODAY<br>VISIT YOU TOMORROW<br>AT FRIEND'S |

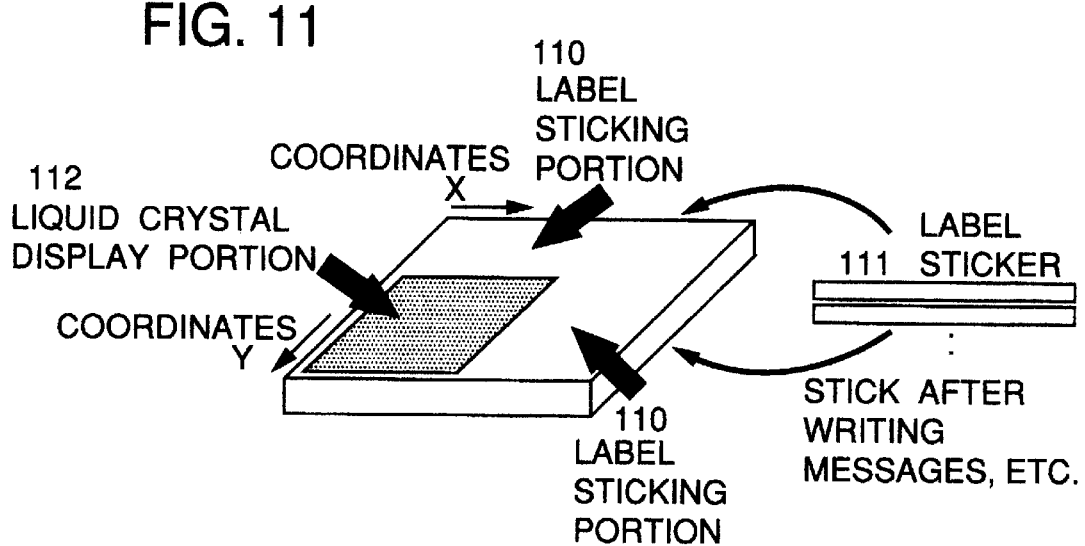
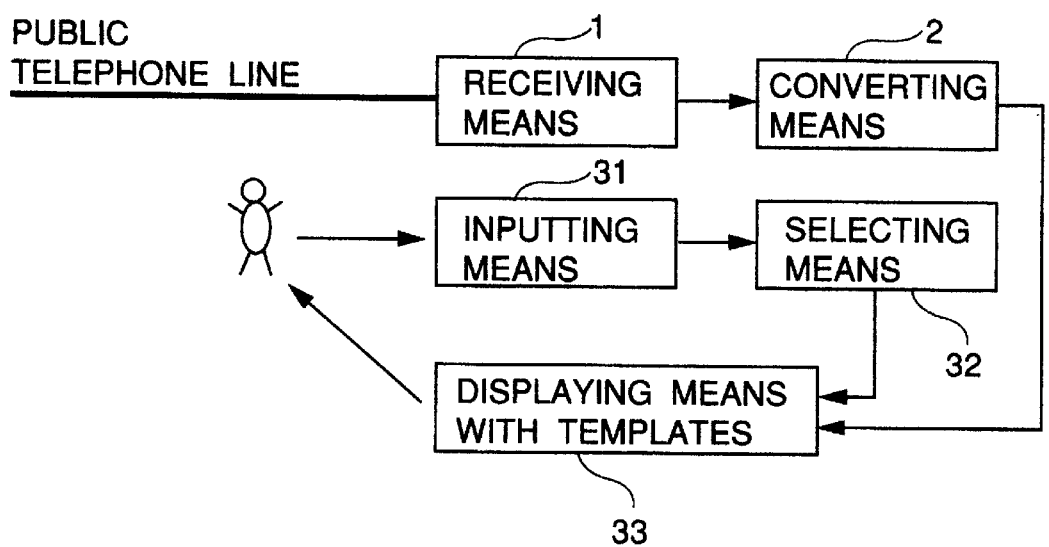

REMOTE CONTROL WITH KEYPAD

FIG. 16

SELECT A TEMPLATE (1) NUMBER OF INPUT COORDINATES : 1,
RANGE : 0.0 - 9.9

- COME HOME LATE TODAY
- EAT OUT TODAY
- COME HOME EARLY TODAY
- PLEASE CALL IMMEDIATELY
- DON'T STAY UP FOR ME
- AT JUKU
- AT FRIEND'S
- WON'T COME HOME TODAY
- SEE FRIEND IN HOSPITAL
- STAY AT GRANDMA'S (2) NUMBER OF INPUT COORDINATES : 1,
RANGE : 0.0 - 9.9

- UMEDA STATION
- JUSO STATION
- AWAJI STATION
- IBARAKI-SHI STATION
- IBARAKI BUS STOP
- HATAKEDA
- IN FRONT OF SUPERMARKET
- HOME (3) NUMBER OF INPUT COORDINATES : 2,
RANGE : 0 - 3, 0.0 - 9.9

| HANAKO, TARO, MOM, DAD | DON'T WAIT FOR ME FOR DINNER |
| | EAT OUT TODAY |
| | COME HOME EARLY TODAY |
| | PLEASE CALL IMMEDIATELY |
| | COME HOME LATE TONIGHT |
| | AT JUKU |
| | AT FRIEND'S |
| | WON'T COME HOME TODAY |
| | SEE FRIEND IN HOSPITAL |
| | STAY AT GRANDMA'S |

(4) NUMBER OF INPUT COORDINATES : 2,
RANGE : 0 - 5, 0.0 - 9.9

| HANAKO, TARO, MOM, DAD, GRANDPA, GRANDMA | COME IMMEDIATELY |
| | CALL IMMEDIATELY |
| | CHANGE IN CONDITION, CALL |
| | CAN'T COME IN TIME |
| | VISIT YOU TODAY |
| | VISIT YOU TOMORROW |
| | AT FRIEND'S |
| | WON'T COME HOME TODAY |
| | SEE FRIEND IN HOSPITAL |
| | STAY AT GRANDMA'S |

FIG. 17

| IDENTIFICATION NUMBER | TEMPLATE |
|---|---|
| 1 | COME HOME LATE TODAY<br>EAT OUT TODAY<br>COME HOME EARLY TODAY<br>PLEASE CALL IMMEDIATELY<br>DON'T STAY UP FOR ME<br>AT JUKU<br>AT FRIEND'S<br>WON'T COME HOME TODAY<br>SEE FRIEND IN HOSPITAL<br>STAY AT GRANDMA'S |
| 2 | UMEDA STATION<br>JUSO STATION<br>AWAJI STATION<br>IBARAKI-SHI STATION<br>IBARAKI BUS STOP<br>HATAKEDA<br>IN FRONT OF SUPERMARKET<br>HOME |
| 3 | HANAKO,TARO,MOM,DAD<br><br>DON'T WAIT FOR ME FOR DINNER<br>EAT OUT TODAY<br>COME HOME EARLY TODAY<br>PLEASE CALL IMMEDIATELY<br>COME HOME LATE TUNIGHT<br>AT JUKU<br>AT FRIEND'S<br>WON'T COME HOME TODAY<br>SEE FRIEND IN HOSPITAL<br>STAY AT GRANDMA'S |
| ⋮ | ⋮ |

METHOD AND APPARATUS FOR RECEIVING A DTMF SIGNAL AND DISPLAYING A FIGURE BASED UPON COORDINATE DATA OBTAINED FROM THE DTMF SIGNAL

BACKGROUND OF THE INVENTION

1. Field of the Invention

The present invention relates to a communication technology using telecommunication, and more specifically, to a method and an apparatus for receiving information which enable sophisticated conveyance of information by transmitting coordinate data from a conventional general telephone capable of generating dual tone matrix frequency (DTMF) signals.

2. Related Art of the Invention

In recent years, since general telephones have been designed to be capable of generating DTMF signals, a number of communication methods using DTMF signals have been proposed and some of the methods have already been in the actual use. For example, in a facsimile apparatus disclosed in Japanese Laid-open Patent Application H7-162663, a pre-stored message is specified with the DTMF signal and the message is displayed at the receiver side. An example of the system structure of the prior art is shown in FIG. 29. In the figure, a receiving means 101 receives a DTMF signal, a decoding means 102 extracts an identification number of the message from the DTMF signal, a message retrieving means 103 retrieves the message from a message relating table 104 based on the identification number, and an outputting means 105 displays the retrieved message on the liquid crystal display screen. In the message relating table 104, identification numbers identified by DTMF signals and pre-stored messages are related with each other. This apparatus has an advantage, for example, that when the message to be transmitted is so simple that it is unnecessary for the receiver to take the trouble to go to the telephone, the message can be transmitted by a simple operation.

However, according to the prior art, only a sentence-form message such as "Late for the meeting" or a combination of a small figure such as an icon and a sentence is displayed and it is difficult to visually convey, for example, the degree or the time of the delay. Additionally, since only character information is displayed, it is necessary for the receiver to read the displayed information and such a message conveys a stiff impression. Further, there are also disadvantages that (1) it is difficult to convey easy-to-understand information which appeals to vision, and that (2) in view of the area of the display screen and the amount of information the user can read without stress, it is impossible to convey information being diversified or rich in expression. A reason for the disadvantages is that the DTMF signals are simple signals transmitting only numbers corresponding to the push buttons of the telephone and the prior art uses the numbers only as identifiers.

SUMMARY OF THE INVENTION

To solve these problems, the present invention provides a method and an apparatus wherein the numbers transmitted with the DTMF signals are received not as identifiers like the prior art but as coordinate data, and by displaying a predetermined figure in the position of coordinate, quantitative information such as degree and time is visually expressed and by regarding the coordinate data as two-dimensional coordinates, a combination of two pieces of information is naturally expressed. With this arrangement, information is displayed in an easy-to-visually-understand format such as the position of coordinates. By using this apparatus in daily life, information is quickly and intuitively exchanged such that the user understands the received information only by looking at the position of coordinates.

Moreover, according to the conventional method and apparatus for receiving information, since it is unknown when information is received, the receiving side is always on standby. Therefore, it is necessary for the receiver to sometimes check whether information has been received or not, which is a heavy load in daily life. In order that such an apparatus is naturally used in daily life, the present invention provides an apparatus using a television receiver which is one of the things that are in sight for the longest time in daily life. Since the television receiver typically has a large display screen, information is naturally and cost-effectively displayed in an easy-to-understand manner. For this reason, it is highly advantageous to combine the information receiving apparatus and the television receiver.

BRIEF DESCRIPTION OF THE DRAWINGS

FIG. 6 is a view showing examples of the output in the embodiment.

FIG. 10 is a view showing examples of template data used as the output in the embodiment.

FIG. 11 is a view showing an example of the outputting means in the embodiment.

FIG. 12 is a block diagram showing the system structure of a method and an apparatus for receiving information according to an embodiment of a second invention.

FIG. 16 is a view showing an example of a display on the display screen used for the example of the inputting means in the embodiment.

FIG. 17 is a view showing an example of a data format representative of the template data storing method in the embodiment.

DESCRPTION OF THE REFERENCE NUMERALS

Figure 1:
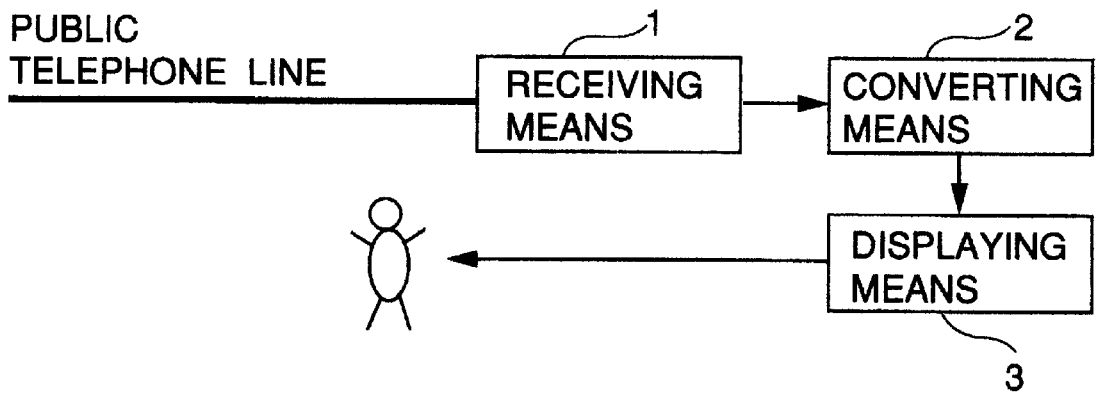
FIG. 1 is a block diagram showing the system structure of a method and an apparatus for receiving information according to an embodiment of a first invention.

1 Receiving means
2 Converting means
3 Displaying means
11 VRAM
12 Main memory
13 Auxiliary memory
14 CPU
31 Inputting means
32 Selecting means
33 Displaying means with templates
41 Template number extracting means
42 Reception retrieving means
43 Coordinate extracting means
51 Television receiving means
52 Television displaying means
101 Receiving means
102 Decoding means
103 Message retrieving means
104 Message relating table
105 Outputting means

PREFERRED EMBODIMENTS OF THE INVENTION

Hereinafter, embodiments of the present invention will be described with reference to the drawings.
(First Embodiment)

FIG. 1 shows the system structure of a method and an apparatus for receiving information according to an embodiment of a first invention. In the figure, reference numeral 1 is a receiving means for receiving DTMF signals over the public telephone line, reference numeral 2 is a converting means for obtaining coordinate data corresponding to the DTMF signals, and reference numeral 3 is a displaying means for displaying a predetermined figure in the position of coordinate based on the coordinate data.

Figure 2:
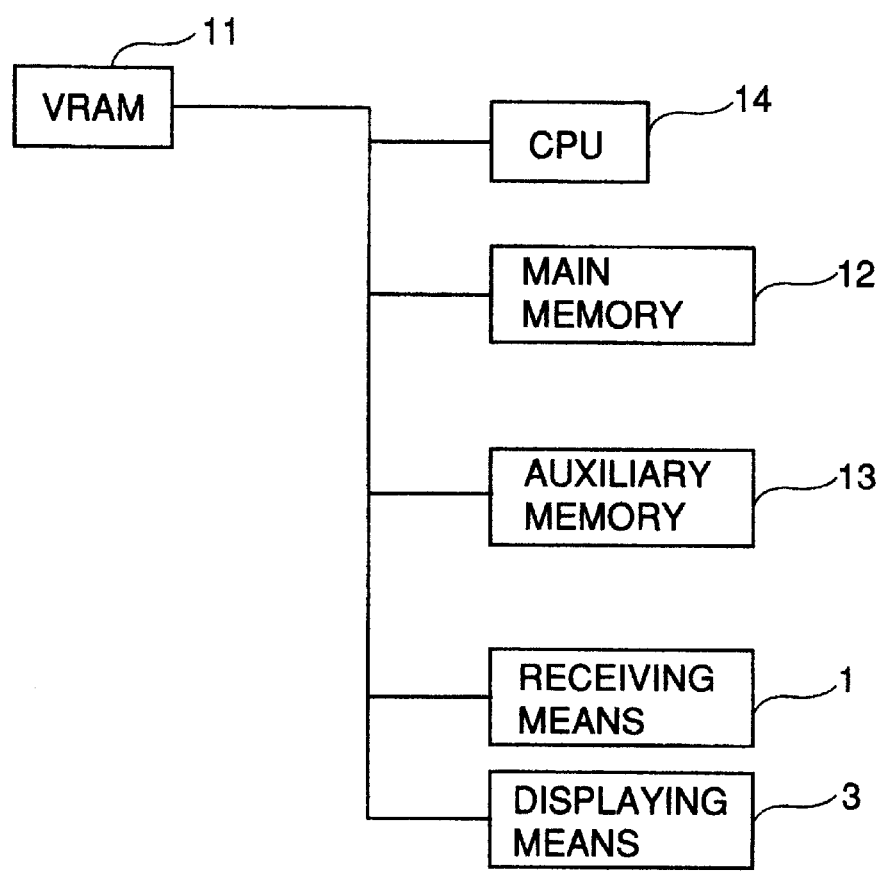
FIG. 2 is a view showing the hardware structure of the embodiment.

The structure of the hardware which implements the system structured as described above is shown in FIG. 2. Basically, the structure of FIG. 2 is the same as that of general purpose calculator systems. The same elements as those of the structure of FIG. 1 are denoted by the same reference numerals and will not be described. In FIG. 2, reference numeral 11 is a video random access memory (VRAM) for storing therein data to be displayed and outputted, reference numeral 12 is a main memory comprising a volatile memory for storing programs, reference numeral 13 is an auxiliary memory comprising a nonvolatile memory for storing programs and data, and reference numeral 14 is a central processing unit (CPU) for executing the programs stored in the main memory 12. As mentioned above, this hardware structure is basically the same as that of general purpose calculator systems and the programs stored in the auxiliary memory 13 are loaded into the main memory 12 before having executed by the CPU 14.

An operation of the information receiving method and apparatus thus structured will be described with reference to the flowchart of FIG. 3.

At step a1, the receiving means 1 waits until a request to connect the line comes (until there is an incoming call) like the normal telephones and connects the line when the request comes. The procedures to connect the line are the same as those of the conventional general apparatuses connected to the public telephone line such as conventional telephones, telephones having the answering function and facsimiles having telephones.

At step a2, the receiving means 1 sends a voice message such as "Please input the display position of the point with a one-digit number" from the receiver side over the line connected at step a1. Such voice answering has already been adopted by apparatuses such as answering machines and telephones having facsimiles and is performed by the same method as that of these apparatuses. Listening to the voice message, the transmitting side performs an operation in accordance with the message.

At step a3, the receiving means 1 detects the DTMF signal inputted over the telephone line by the transmitting side. The method for detecting DTMF signals has already been established and the general method is used which is adopted by conventional technologies such as the remote operation of conventional answering machines. For example, when the transmitter pushes "2" on a public telephone of pushbutton type, a DTMF signal corresponding thereto is transmitted from the transmitting side and the receiving side detects the DTMF signal.

At step a4, it is determined whether or not the DTMF signal detected at step a3 is representative of a number within a predetermined range or the valid number of digits. For example, in the case where the range is between 0 and 9 and the valid number of digits is two or less, when the DTMF signal detected at step a3 is representative of three or more digits, the process proceeds to step a5 because the signal is not representative of the valid number of digits. The valid number is decided according to the range which can be specified as a coordinate value at the receiving side and the precision. For example, the valid number is decided such that the range that can be specified as a coordinate value is real numbers from 0 to 9 and the number of decimal places is one and that, of the DTMF signals received, the first DTMF signal is representative of the integral part and the second DTMF signal is representative of the digit in the first decimal place. When the transmitter intends to transmit, for example, a real number 4.5 as the coordinate value, two DTMF signals representative of "4" and "5", respectively, are successively transmitted. In such a case, if three DTMF signals representative of "3", "4" and "5", respectively, are successively transmitted, it is determined that the number of digits is invalid.

At step a5, since it is determined at step a4 that the DTMF signal transmitted from the transmitting side is invalid, the receiving means 1 returns a message indicating that the signal is invalid, and disconnects the line. For example, a message such as "The inputted number does not represent a valid point position" is returned.

After the message is returned, the process may return to step a3 after sending a message to request re-input without immediately disconnecting the line.

At step a6, since it is determined at step a4 that the DTMF signal transmitted from the transmitting side is valid, the receiving means 1 returns a message indicating that the signal is valid and disconnects the line. For example, a message such as "The inputted number has been accepted" is returned.

At step a7, the converting means 2 converts the number corresponding to the DTMF signal detected at step a3 into a coordinate value by use of a function f. As an example of the function f, a case will be described where the range to be displayed is real numbers from 0 to 9, the number of digits of the DTMF signals to be accepted as the input is two, the first digit is representative of one of the digits of the integral part and the second digit is representative of the digit in the first decimal place. When the numbers inputted with the DTMF signals are x and y, $f(x,y)=x+y/10$ is used. For example, when DTMF signals corresponding to "2" and "3" are successively transmitted from the transmitting side, $2+3/10=2.3$ is calculated as the result of the conversion by use of the function f.

The number of arguments of the function f varies according to the number of digits of the DTMF signals decided as the valid range. For example, when only DTMF signals representative of one digit are accepted, $f(x)$ is used. When three digits are accepted, $f(x,y,z)$ is used where the numbers inputted with DTMF signals are x, y and z. As a specific example of $f(x,y,z)$, when the first digit of the DTMF signal is one of the digits of the integral part, the second digit of the DTMF signal is the digit in the first decimal place and the third digit of the DTMF signal is the digit in the second decimal plane, $f(x,y,z)=x+y/10+z/100$.

Figure 4:
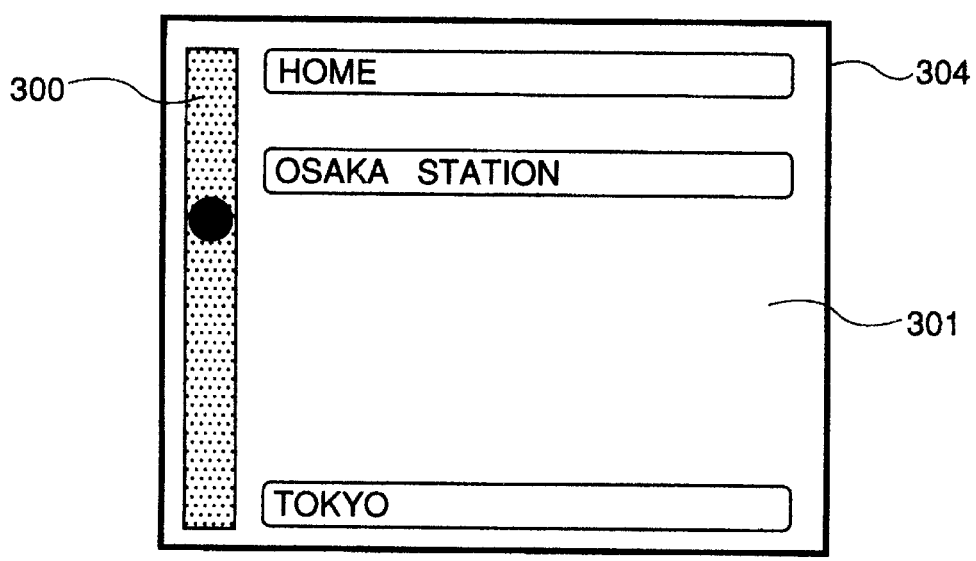
FIG. 4 is a view showing an example of an output in the embodiment.
Figure 5:
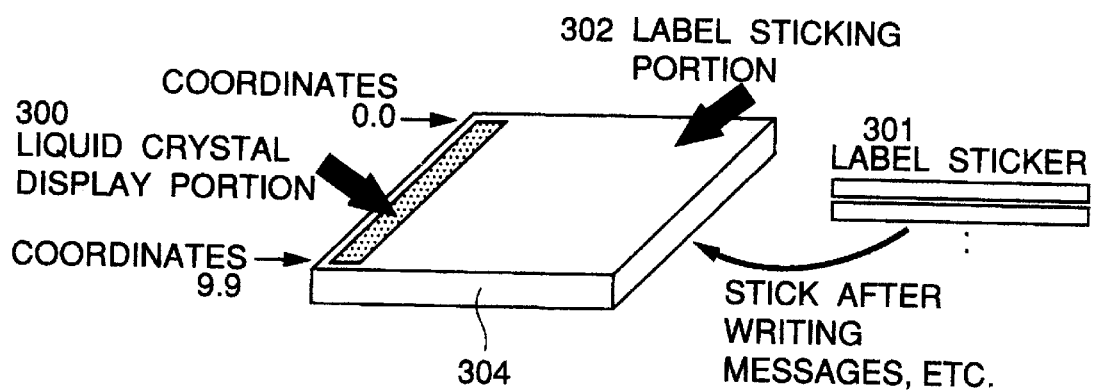
FIG. 5 is a view showing an example of an outputting means in the embodiment.

At step a8, the displaying means 3 displays a predetermined figure (a black circle in this embodiment) in the position of the coordinate value obtained as the conversion result at step a7. For example, the figure is displayed as shown in FIG. 4. In the case of FIG. 4, a display means as shown in FIG. 5 is prepared as the displaying means 3. A label sticker 301 of FIG. 5 is used by writing thereon messages, symbols or figures in advance with a pen such as a ballpoint pen and sticking it onto a label sticking portion 302 on a base plate 304. In the example of FIG. 4, the father of a family living near Osaka Station went to Tokyo on business and the current location of the father who is on his way back home is shown on a liquid crystal display screen 300. In this case, it is very useful for the family to know the current location of the father because the mother, for example, can start the preparation of dinner when the father reaches a vicinity of Osaka Station. As other examples, by adding to the displaying means 3 simple messages as shown in (a) of FIG. 6, a graph representing a degree as shown in (b) of FIG. 6 and a simple map as shown in (c) of FIG. 6, diversified information is received.

Figure 7:
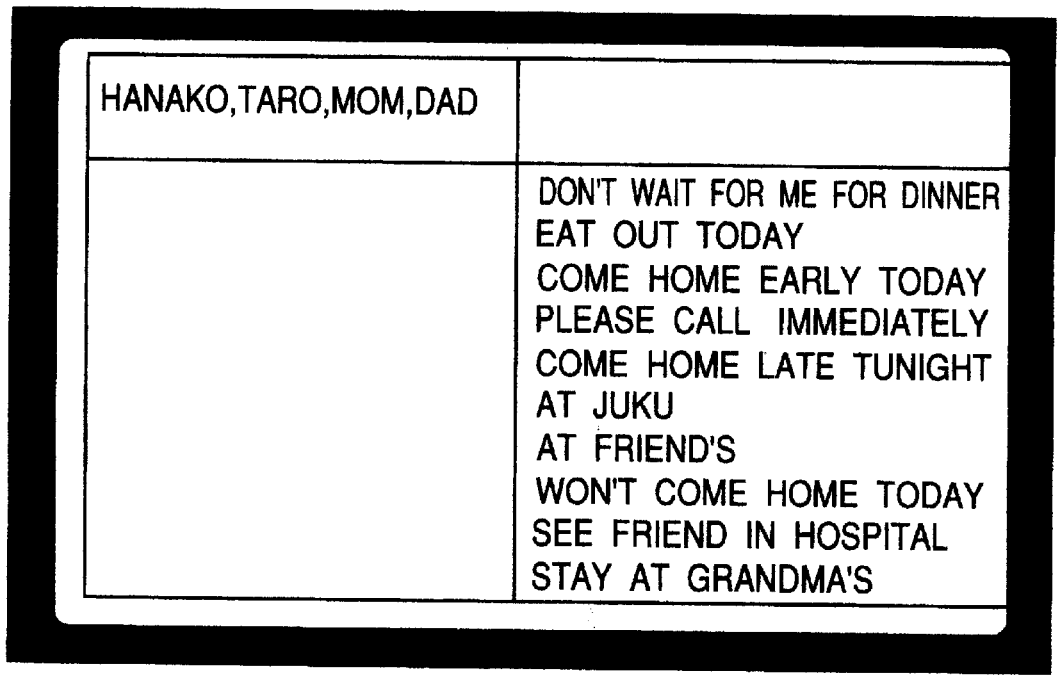
FIG. 7 is a view showing an example of template data used as the output in the embodiment.
Figure 8:
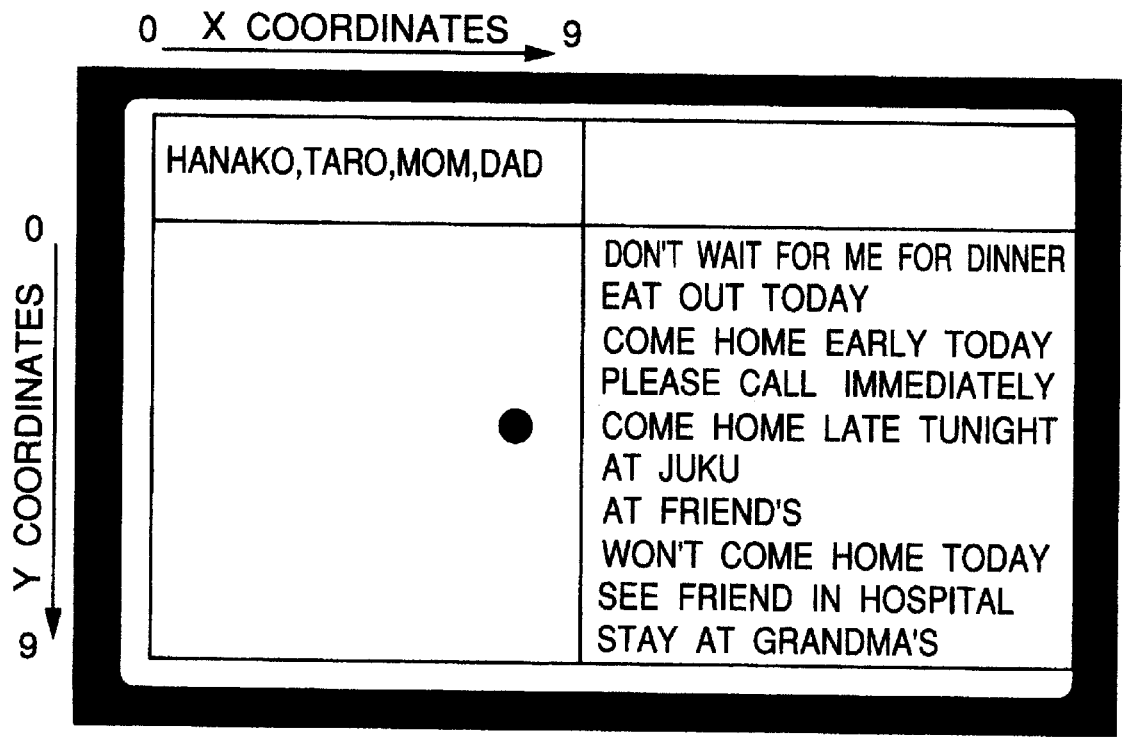
FIG. 8 is a view showing an example of the output in the embodiment.
Figure 9:
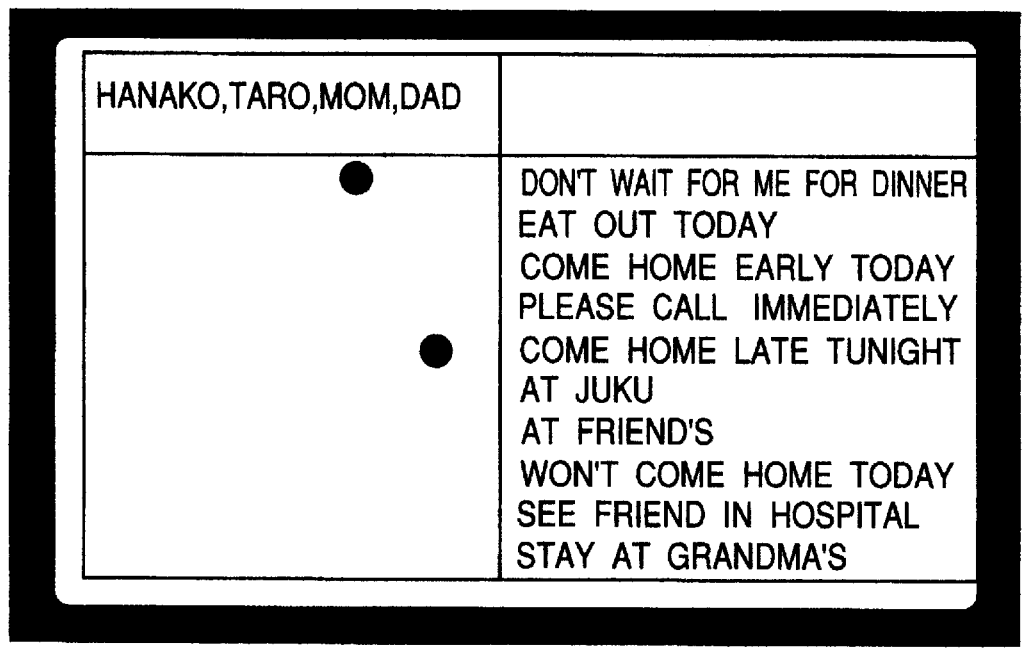
FIG. 9 is a view showing an example of the output in the embodiment.

Subsequently, another example of this embodiment will be shown. In this example, two-dimensional information as shown in FIG. 7 is previously stored in the displaying means 3 as template data. In providing a display, a predetermined figure (a black circle in this embodiment) is displayed so as to be superimposed on the template in the position of the coordinate value based on the received information. At this time, the transmitting side has the same template stored, for example, in an electronic organizer. For example, the template of FIG. 7 is stored in a memory as image data and the displaying means 3 receives DTMF signals representative of two-dimensional coordinates comprising x and y coordinates from the transmitting side. As an example, a case will be considered where a DTMF signal representative of one digit is received as each of the x and y coordinates and the displaying means 3 is capable of displaying a range of x and y coordinates from 0 to 9. In this case, when DTMF signals representative of "3" and "4" are received from the transmitting side, as shown in FIG. 8, a black circle is displayed so as to be superimposed on the template in the position where the x coordinate is 3 and the y coordinate is 4, so that the receiving side confirms that a message "Come home late tonight" is received from "Dad." When a message "Don't wait for me for dinner" is also received from "Mom" by a public telephone at another place ("2" and "0" in the DTMF signals), the two messages are simultaneously displayed in an easy-to-understand manner as shown in FIG. 9. Thus, by displaying not the message itself but a predetermined figure so as to be superimposed on a two-dimensional template in the position of two-dimensional coordinates, who has sent a message and who has not can be confirmed at a glance. Further, by showing urgent messages in upper rows and distinguishing them from other messages by leaving a space of one row therebetween as shown in (a) of FIG. 10, easy-to-visually-understand display is realized such that whether an urgent message has come or not is immediately confirmed only by looking at the upper rows. (b) of FIG. 10 shows an example in which templates are stored where consideration is given to the size of characters of the messages such that urgent messages are written in bigger characters so that users for whom it is difficult to read small characters can surely confirm urgent messages. When the template as shown in (b) of FIG. 10 is used, the y coordinate specified at the transmitting side is adjusted such as 0, 2, 4, 6, 7, 8, 9 between the bigger character message portion and the smaller character message portion. While the templates are stored in a memory as image data in this example, a piece of paper such as a label sticker on which such two-dimensional information has been written with a pencil and the like may be used together with a displaying means (a liquid crystal display screen 112 in the figure) on which only black circles are displayed in the positions corresponding to the two-dimensional coordinates as shown in FIG. 11. Reference numeral 111 is a label sticking portion.

As shown in the examples described above, it is needless to say that when the coordinate system to be displayed and the numbers corresponding to the received DTMF signals coincide with each other, the function used for the conversion by the converting means 2 may be an identity mapping where the identify function for an input x is $f(x)=x$.

(Second Embodiment)

Figure 13:
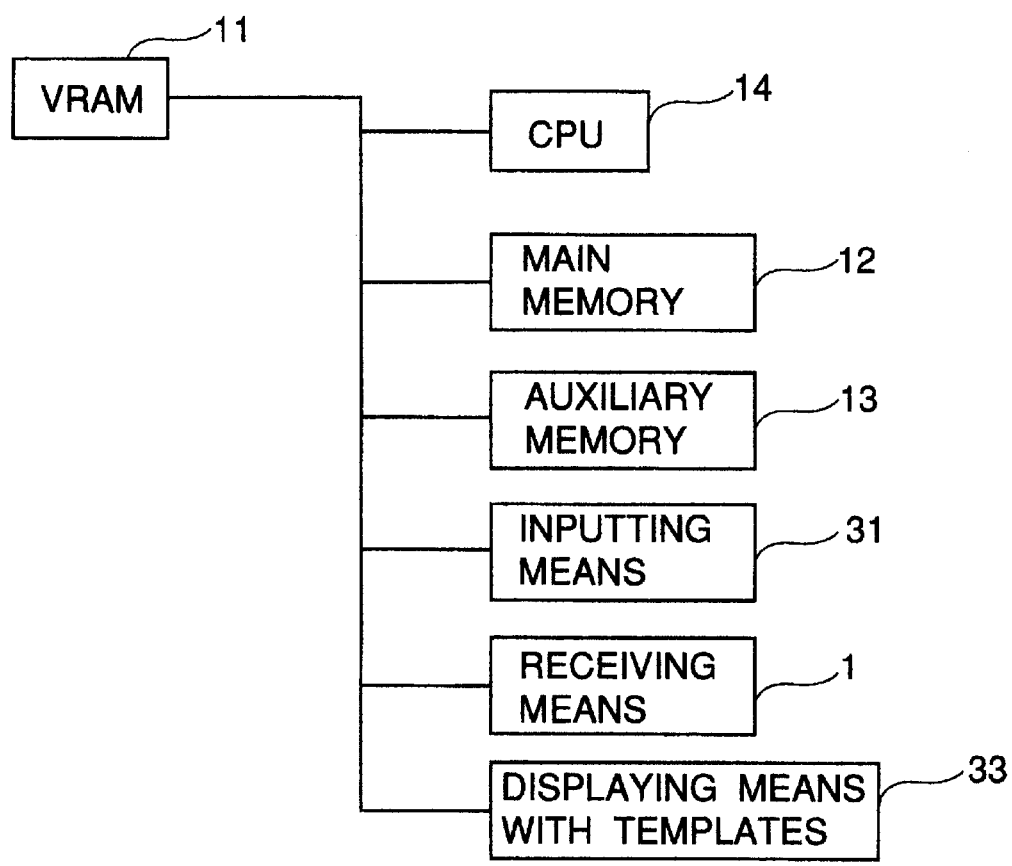
FIG. 13 is a view showing an example of the hardware structure of the embodiment.

FIG. 12 shows the system structure of an information receiving method and an information receiving apparatus according to an embodiment of a second invention. In FIG. 12, the same elements as those of the embodiment of the first invention are denoted by the same reference numerals and will not be described. Reference numeral 31 is an inputting means for accepting a specification of a template by the user at the receiving side. Reference numeral 32 is a selecting means for, when a specification of a template by the user is accepted by the inputting means 31, selecting the template from among a plurality of pre-stored templates based on the specification. Reference numeral 33 is a displaying means with templates for displaying a predetermined figure so as to be superimposed on or combined with the selected template in a position based on the coordinate data on the template. The structure of the hardware which implements the system structured as described above is shown in FIG. 13. Basically, the structure of FIG. 13 is the same as that of general purpose calculator systems. Since the elements are the same as those of the information receiving method and apparatus shown in FIG. 2 and those of the system structure shown in FIG. 12, the same elements are denoted by the same reference numerals and will not be described.

An operation of the information receiving method and the information receiving apparatus thus structured will be described with reference to the flowchart of FIG. 14.

Figure 15:
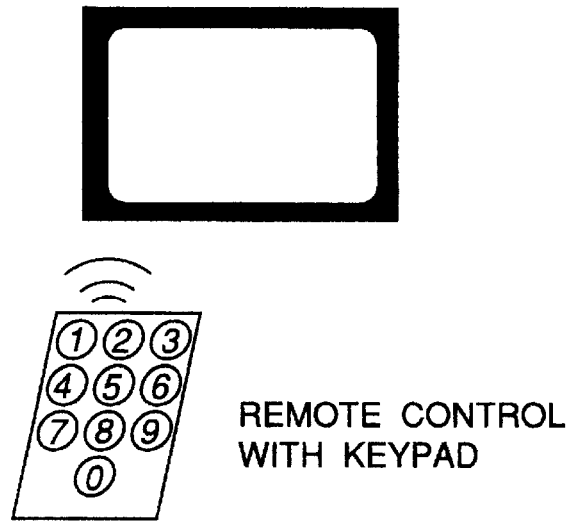
FIG. 15 is a view showing an example of an inputting means in the embodiment.

At step b1, an input by the user to specify a template is accepted. For example, the inputting means 31 is formed of a simple display screen and a numeric keypad as shown in FIG. 15, and a display as shown in FIG. 16 is given on the display screen and the input from the numeric keypad is accepted.

Another method which may be used is such that the inputting means 31 is formed of only a keypad, and a booklet showing all the stored templates and their identification numbers is provided so that the user inputs only the identification number.

At step b2, the template is retrieved based on the identification number inputted at step b1. A plurality of templates are previously stored in the selecting means 32 so as to be retrievable based on their identification numbers as shown in FIG. 17. While the templates are expressed as pictures in FIG. 17 for ease of understanding, they are stored as image data in actuality.

Figure 3:
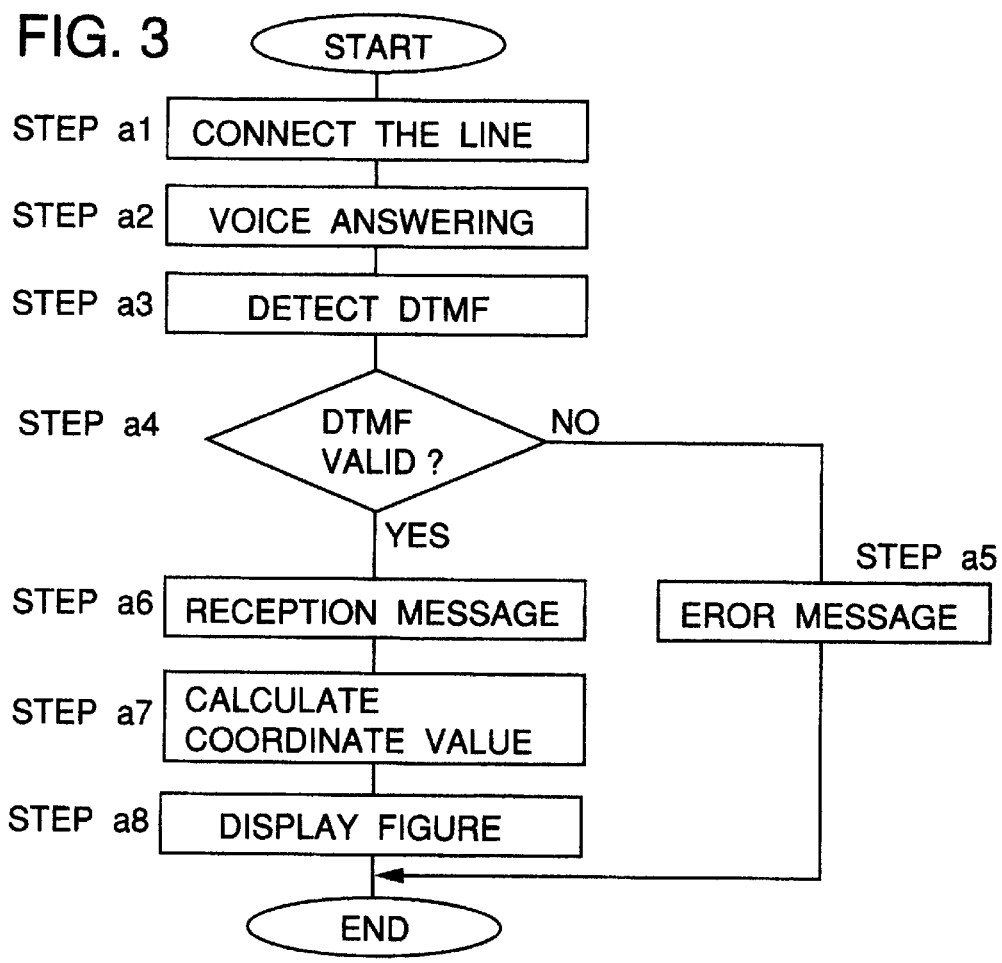
FIG. 3 is a flowchart showing the operation procedures of the method and apparatus for receiving information according to the embodiment of the first invention.

At steps b3 to b9, the same operations as those of steps a1 to a7 described with reference to the flowchart of FIG. 3 are performed.

Figure 18:
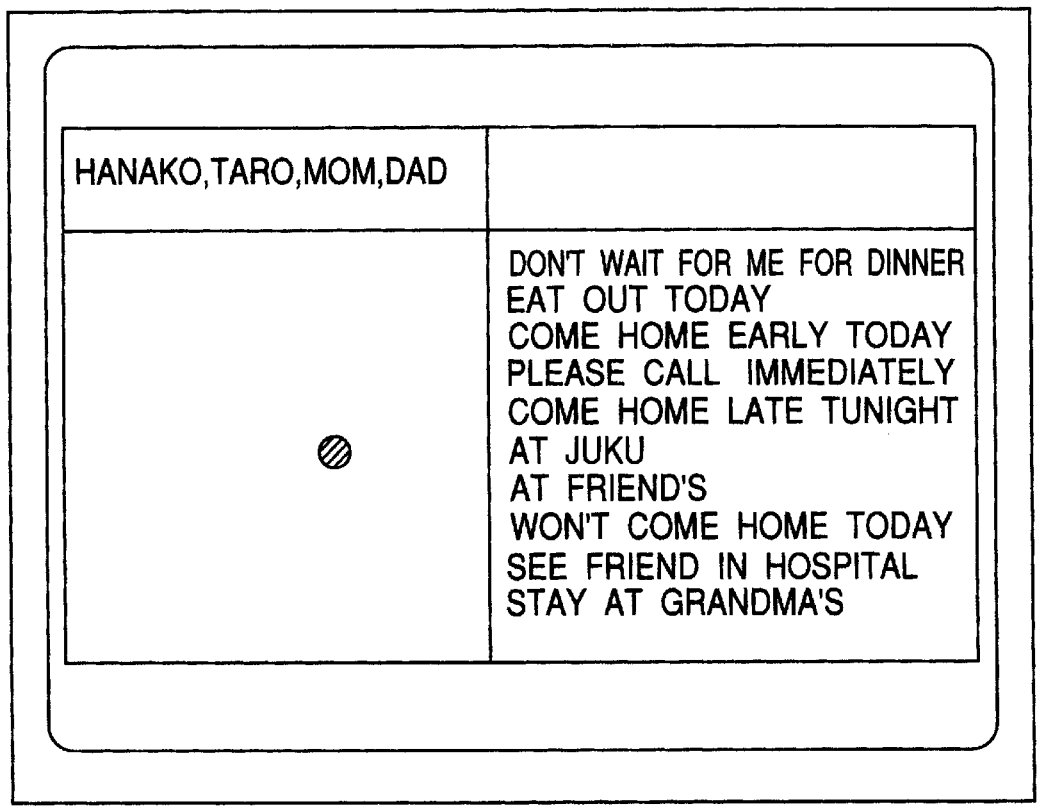
FIG. 18 is a view showing an example of an output in the embodiment.

At step b10, the displaying means 33 with templates displays a predetermined figure (a black circle in this embodiment) so as to be superimposed on the template retrieved at step b2 in the position of the coordinates converted at step b9. For example, a case will be considered where the displaying means 33 with templates is formed of a display screen and a template whose identification number is 3 is retrieved from among the templates of FIG. 17 at step b2. In that case, when the coordinates converted at step b9 are such that the x coordinate is 2 and the y coordinate is 4.0, a display as shown in FIG. 18 is given. The transmitter and the receiver have previously agreed on the templates to be selected.

(Third Embodiment)

Figure 19:
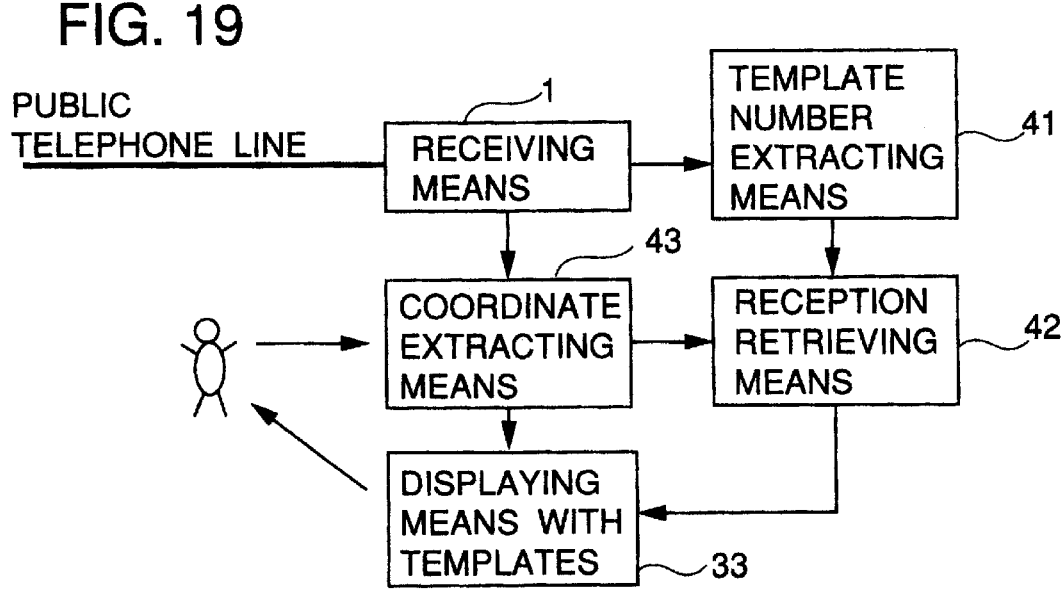
FIG. 19 is a block diagram showing the system structure of a method and an apparatus for receiving information according to an embodiment of a thir d invention.
Figure 20:
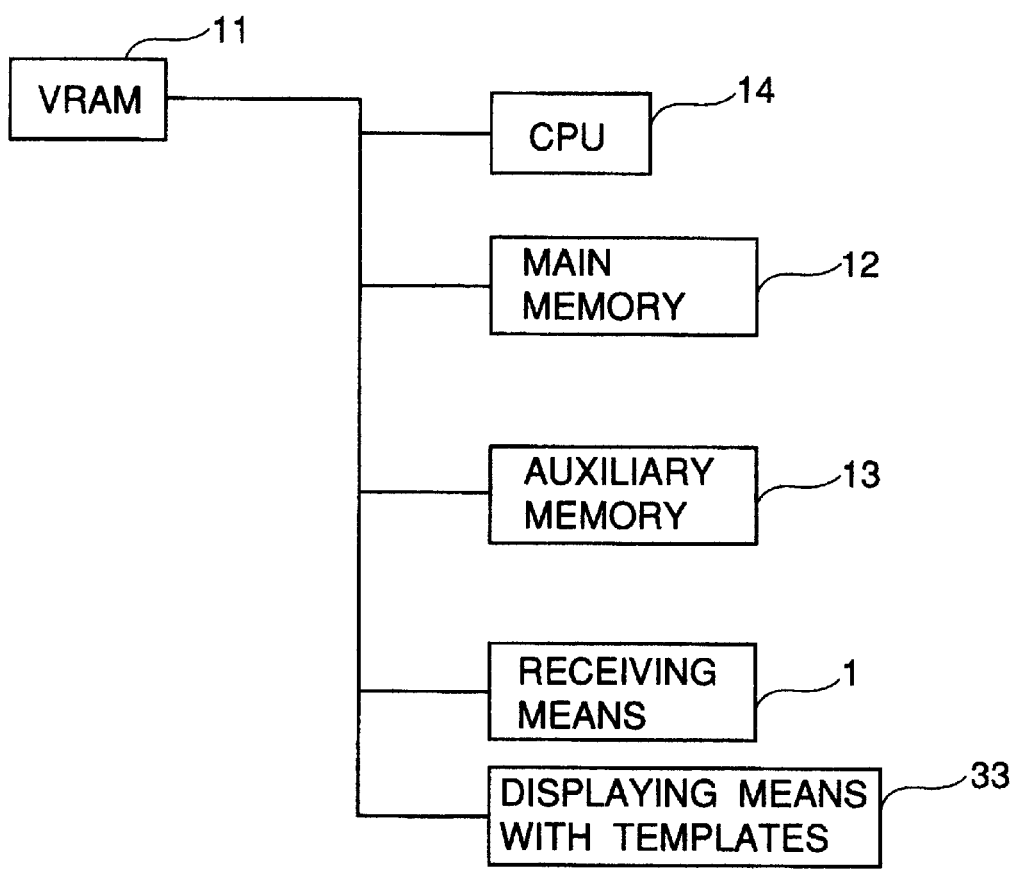
FIG. 20 is a view showing an example of the hardware structure of the embodiment.

FIG. 19 shows the system structure of an information receiving method and an information receiving apparatus according to a third embodiment of the invention. In FIG. 19, the same elements as those of the embodiment of the second invention are denoted by the same reference numerals and will not be described. Reference numeral 41 is a template number extracting means for extracting a number specifying a template from a predetermined part of the DTMF signal received by the receiving means 1. Reference numeral 42 is a reception retrieving means for retrieving the template from among a plurality of pre-stored templates based on the number. Reference numeral 43 is a coordinate extracting means for extracting a corresponding number from another part of the DTMF signal to convert it into coordinate data. The structure of the hardware which implements the system structured as described above is shown in FIG. 20. Basically, the structure of FIG. 20 is the same as that of general purpose calculator systems. Since the elements are the same as those of the information receiving method and apparatus shown in FIG. 2 and those of the system structure shown in FIG. 19, the same elements are denoted by the same reference numerals and will not be described.

An operation of the information receiving method and apparatus thus structured will be described with reference to the flowchart of FIG. 21.

At step c1, an operation similar to that of step a1 described with reference to the flowchart of FIG. 3 is performed.

At step c2, while an operation similar to that of step a2 described with reference to the flowchart of FIG. 3 is performed, a voice message is used which requests input of the template number as well as the display position of the point such as "Please input the display position of the point with a one-digit number and then input the template number."

At step c3, an operation similar to that of step a3 described with reference to the flowchart of FIG. 3 is performed.

At step c4, while an operation similar to that of step a4 described with reference to the flowchart of FIG. 3 is performed, it is determined whether the inputted template number is valid or not as well as whether the inputted point position is valid or not. The process proceeds to step c6 when both are valid, and to step c5 otherwise.

At steps c5 and c6, operations similar to those of steps a5 and a6 described with reference to the flowchart of FIG. 3 are performed.

At step c7, the template number extracting means 41 extracts a part corresponding to the template number from the numbers corresponding to the DTMF signals received at step c3. The part corresponding to the template number is predetermined such that the second number of the successively specified numbers is regarded as the template number. When the part corresponding to the template number is determined like this, at this step, the second number of the numbers successively specified as the DTMF signals is extracted.

At step c8, the reception retrieving means 42 retrieves the template based on the template number extracted at step c7. In the reception retrieving means 42, templates are previously stored in a format as shown in FIG. 17 and the retrieval is performed by the normal method with the template number as the key.

At step c9, the coordinate extracting means 43 extracts a part corresponding to the coordinates from the numbers corresponding to the DTMF signals received at step c3. The part corresponding to the coordinates is predetermined such that the first and succeeding numbers of the numbers successively specified by the DTMF signals are regarded as coordinate data. When the part corresponding to the coordinates is determined like this, at this step, the first number of the successively specified numbers is extracted.

At step c10, the coordinate extracting means 43 performs an operation similar to that of step a7 described with reference to the flowchart of FIG. 3.

Figure 14:
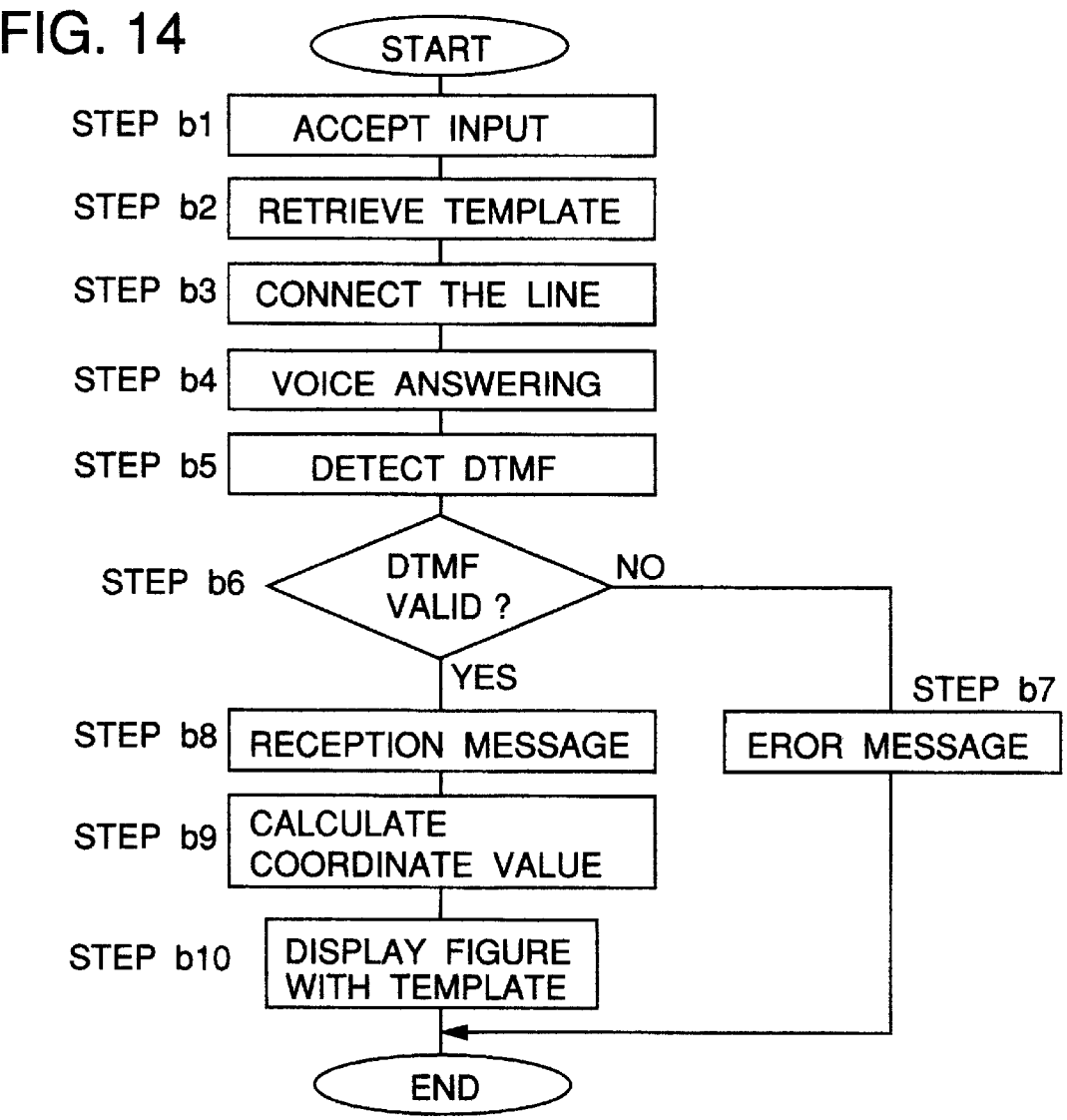
FIG. 14 is a flowchart showing the operation procedures of the method and apparatus for receiving information according to the embodiment of the second invention.

At step c11, an operation similar to that of step b10 of the flowchart shown in FIG. 14 is performed for the template retrieved at step c8 and the coordinate value converted at step c10.

(Fourth Embodiment)

As another embodiment of the first invention, an information receiving apparatus is shown comprising a television receiving means for receiving television broadcasts and a television displaying means for displaying the received television broadcasts, wherein the displaying means displays a predetermined figure so as to be superimposed on or instead of or in addition to the television broadcast displayed on the television displaying means.

Figure 22:
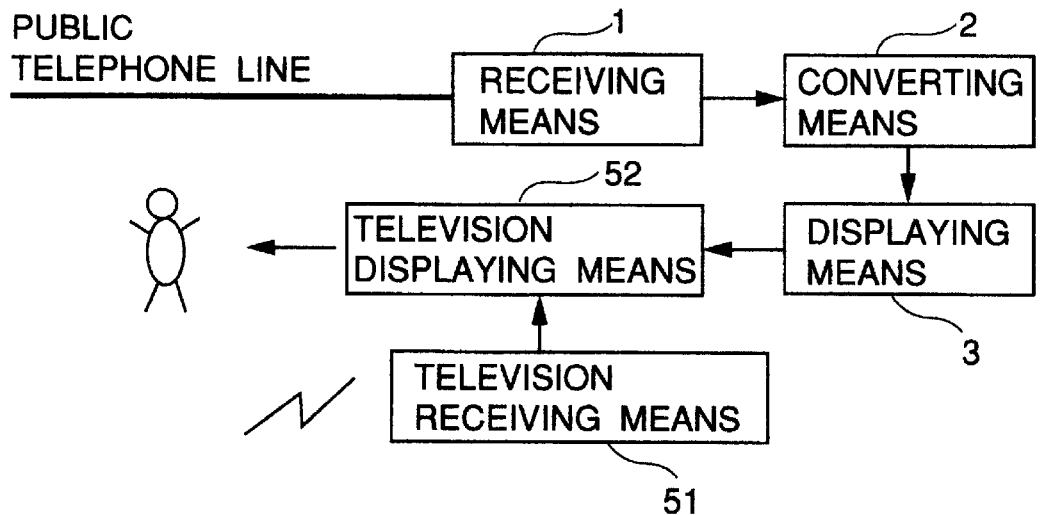
FIG. 22 is a block diagram showing the system structure of a method and an apparatus for receiving information according to another embodiment of the first invention.
Figure 23:
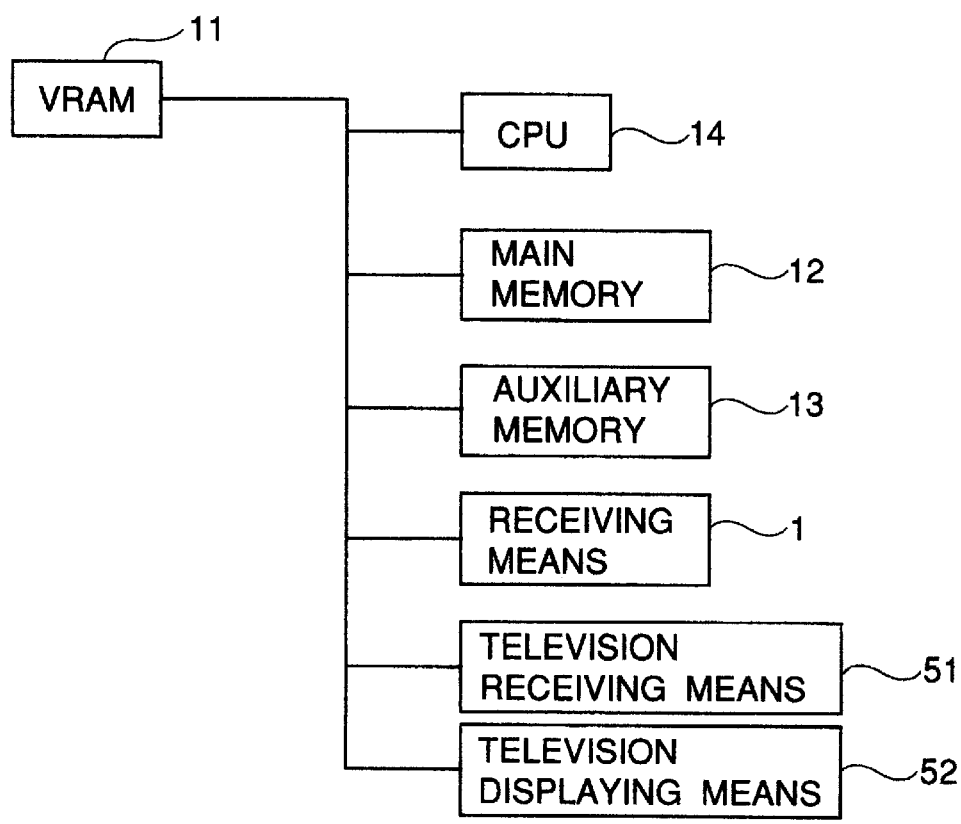
FIG. 23 is a view showing an example of the hardware structure of the embodiment.

FIG. 22 shows the system structure of the embodiment. In FIG. 22, the same elements as those of the previously described embodiment of the first invention are denoted by the same reference numerals and will not be described. Reference numeral 51 is a television receiving means for receiving television broadcasts. Reference numeral 52 is a television displaying means for displaying the received television broadcasts. The displaying means 3 displays a predetermined figure so as to be superimposed on or instead of or in addition to the television broadcast displayed on the television displaying means 52. The structure of the hardware which implements the system structured as described above is shown in FIG. 23. Basically, the structure of FIG. 23 is the same as that of general purpose calculator systems. Since the elements are the same as those of the information receiving method and apparatus shown in FIG. 2 and those of the system structure shown in FIG. 22, the same elements are denoted by the same reference numerals and will not be described.

Figure 24:
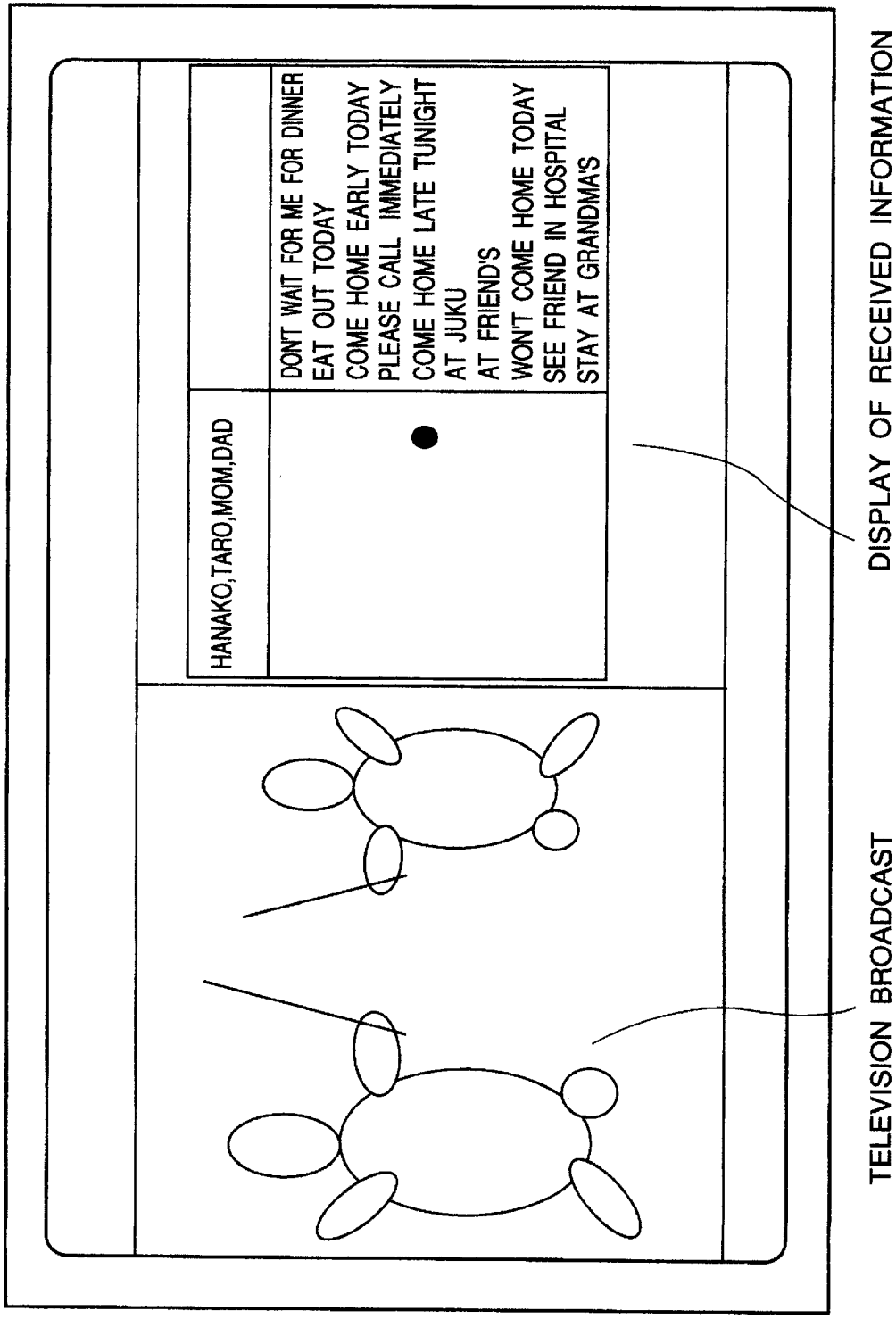
FIG. 24 is a view showing an example of an output in the embodiment.

An operation of the information receiving apparatus thus structured is performed such that before step al of the flowchart of FIG. 3, a step to receive a television broadcast and a step to display the received television broadcast are performed and at step a8 to provide a display, the received information is displayed, for example, in addition to the television broadcast. Examples of the display include the one as shown in FIG. 24 using a television displaying means 22 comprising a display screen divided into two parts.

Needless to say, the information may be displayed in a small frame provided on the television display screen not divided into parts or may be shown as a display of another channel or of a video channel.

(Fifth Embodiment)

As another embodiment of the second invention, an information receiving apparatus is shown comprising a television receiving means for receiving television broadcasts and a television displaying means for displaying the received television broadcasts, wherein the displaying means with templates displays a predetermined figure so as to be superimposed on or instead of or in addition to the television broadcast displayed on the television displaying means.

Figure 25:
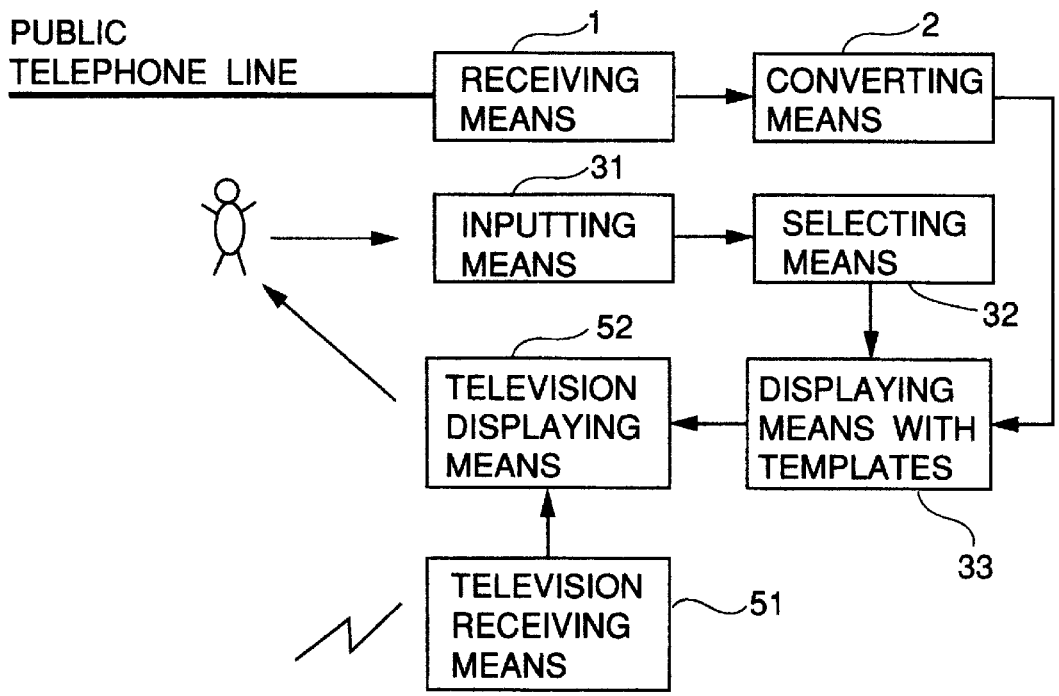
FIG. 25 is a block diagram showing the system structure of a method and an apparatus for receiving information according to another embodiment of the second invention.
Figure 26:
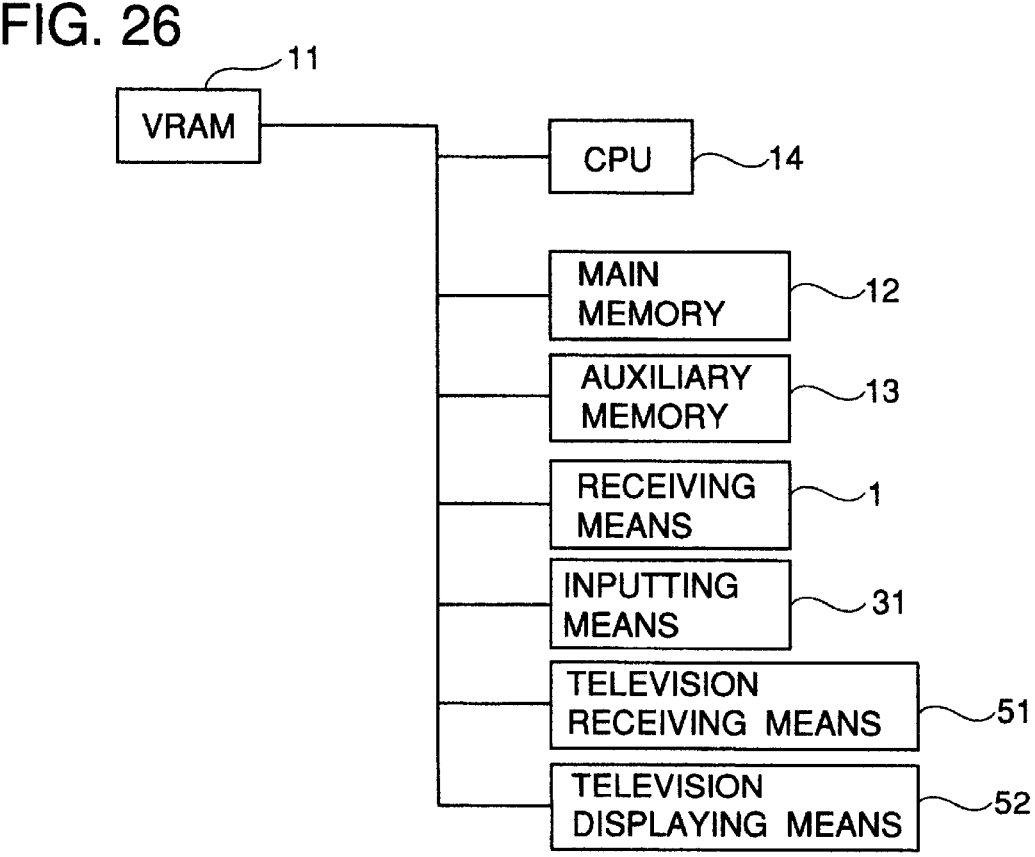
FIG. 26 is a view showing the hardware structure of the embodiment.

FIG. 25 shows the system structure of the embodiment. Since the elements of FIG. 25 are the same as those of the system structure shown in FIG. 12 and those of the system structure shown in FIG. 22, the same elements are denoted by the same reference numerals and will not be described. The structure of the hardware which implements the system structured as described above is shown in FIG. 26. Basically, the structure of FIG. 26 is the same as that of general purpose calculator systems. Since the elements are the same as those of the information receiving method and apparatus shown in FIG. 2 and those of the system structure shown in FIG. 25, the same elements are denoted by the same reference numerals and will not be described.

An operation of the information receiving apparatus thus structured is performed such that before step b1 of the flowchart of FIG. 14, a step to receive a television broadcast and a step to display the received television broadcast are performed and at step b10 to provide a display, the received information is displayed, for example, in addition to the television broadcast. Examples of the display include the previously-mentioned one shown in FIG. 24 using the television displaying means 22 comprising a display screen divided into two parts.

Needless to say, the information may be displayed in a small frame provided on the television display screen not divided into parts or may be shown as a display of another channel or of a video channel.

(Sixth Embodiment)

As another embodiment of the third invention, an information receiving apparatus is shown comprising a television receiving means for receiving television broadcasts and a television displaying means for displaying the received television broadcasts, wherein the displaying means with templates displays a predetermined figure so as to be superimposed on or instead of or in addition to the television broadcast displayed on the television displaying means.

Figure 27:
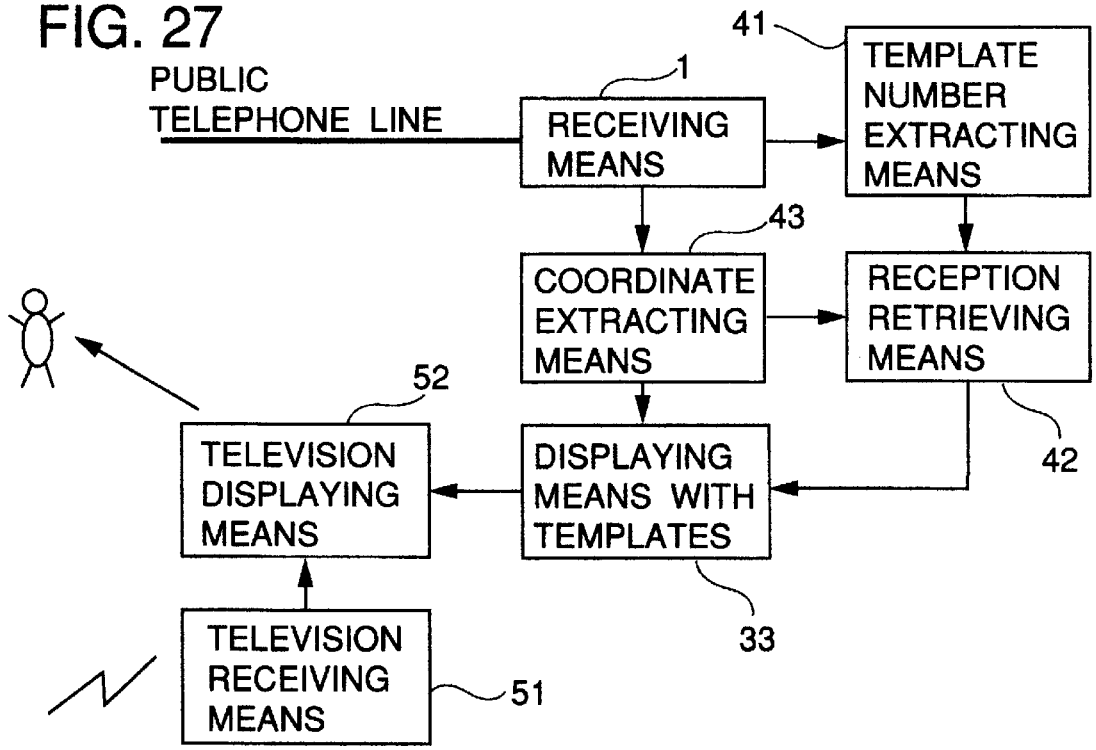
FIG. 27 is a block diagram showing the system structure of a method and an apparatus for receiving information according to another embodiment of the third invention.
Figure 28:
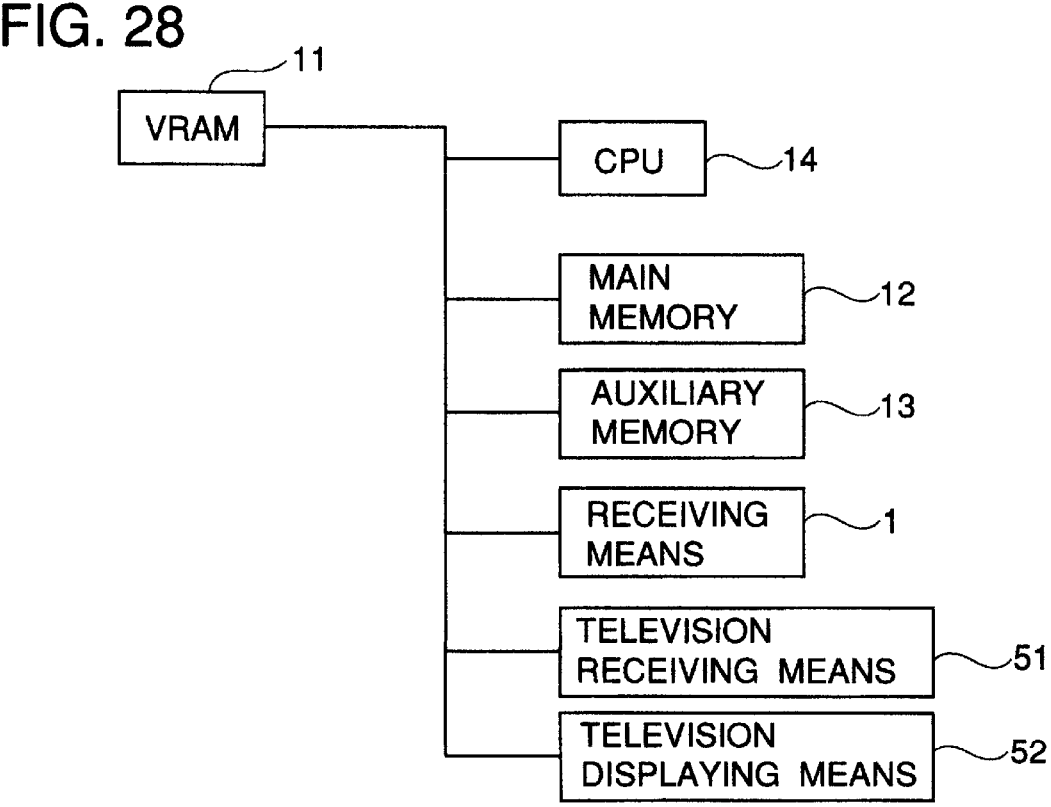
FIG. 28 is a view showing an example of the hardware structure of the embodiment.
Figure 29:
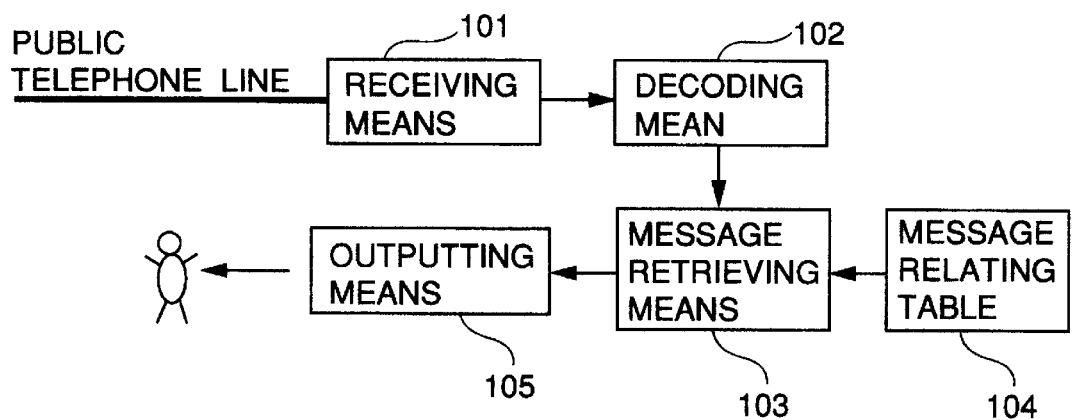
FIG. 29 is a block diagram showing the system structure in the prior art.

FIG. 27 shows the system structure of the embodiment. Since the elements of FIG. 27 are the same as those of the system structure shown in FIG. 19 and those of the system structure shown in FIG. 22, the same elements are denoted by the same reference numerals and will not be described. The structure of the hardware which implements the system structured as described above is shown in FIG. 28. Basically, the structure of FIG. 28 is the same as that of general purpose calculator systems. Since the elements are the same as those of the information receiving method and apparatus shown in FIG. 2 and those of the system structure shown in FIG. 27, the same elements are denoted by the same reference numerals and will not be described.

Figure 21:
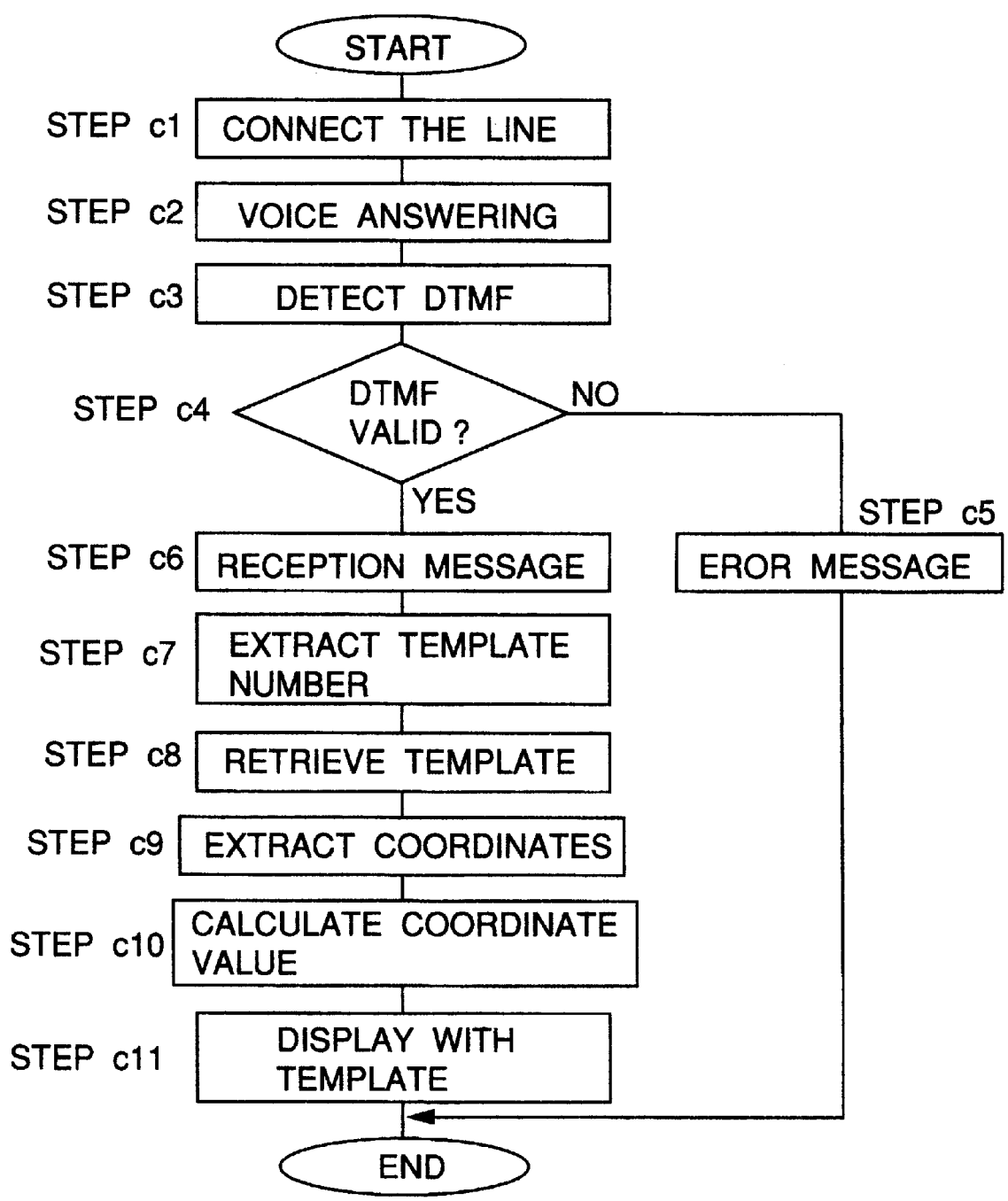
FIG. 21 is a flowchart showing the operation procedures of the method and apparatus for receiving information according to the embodiment of the third invention.

An operation of the information receiving apparatus thus structured is performed such that before step cl of the flowchart of FIG. 21, a step to receive a television broadcast and a step to display the received television broadcast are performed and at step c11 to provide a display, the received information is displayed, for example, in addition to the television broadcast. Examples of the display include the previously-mentioned one shown in FIG. 24 using the television displaying means 22 comprising a display screen divided into two parts.

Needless to say, the information may be displayed in a small frame provided on the television display screen not divided into parts or may be shown as a display of another channel or of a video channel.

While the embodiments of the inventions are described using the hardware structure of general purpose calculator systems, the means included in the apparatus may be formed of hardware specifically designed therefor.

While the DTMF signals are received over the public telephone line in all the inventions, the DTMF signals may be received over any line including a domestic extension that is capable of transmitting and receiving the DTMF signals.

According to the first invention, by regarding the numbers specified by the DTMF signal as coordinate data, quantitative information such as degree and time is visually expressed and by regarding the numbers as two-dimensional coordinates, a combination of two pieces of information is naturally expressed, so that the conveyance of information is facilitated. Since information is displayed in an easy-to-visually-understand format such as the position of coordinates, by using such an apparatus in daily life, the received information is immediately understood only by looking at the position of coordinates, so that the time to understand the information and the burden of reading letters are reduced at the information receiving side.

According to the second invention, in addition to the advantages of the first invention, the contents and formats of the messages to be transmitted may easily be changed according to the various cases such as seasons and periods by selecting a template with the inputting means, so that more diversified information may be received.

According to the third invention, in addition of the advantages of the first and second inventions, the contents and formats of the messages to be transmitted may be changed by specifying a template number at the time of transmission, so that the reception of diversified information is realized by a simple real-time operation such as the specification of a template number.

What is claimed is:

1. An information receiving apparatus comprising receiving means for receiving a DTMF signal over a telephone line, converting means for obtaining coordinate data corresponding to the received DTMF signal, and displaying means for displaying a predetermined figure in a coordinate position based on the coordinate data, wherein said displaying means is combined with a base plate having a template formed thereon.

2. An information receiving apparatus as claimed in claim 1, wherein said converting means obtains the coordinate data corresponding to the DTMF signal by use of an identity mapping.

3. An information receiving apparatus as claimed in claim 1, wherein in obtaining the coordinate data corresponding to the DTMF signal, said converting means converts the coordinate data into two-dimensional coordinates.

4. An information receiving apparatus as claimed in claim 1, further comprising television receiving means for receiving a television broadcast and television displaying means for displaying the received television broadcast, wherein said displaying means displays the predetermined figure so as to be superimposed on or instead of or in addition to the television broadcast displayed on the television displaying means.

5. An information receiving method comprising the steps of receiving a DTMF signal over a telephone line, obtaining coordinate data corresponding to the received DTMF signal, and displaying a predetermined figure in a position based on the coordinate data, said position being on a pre-stored template, and said predetermined figure being displayed so as to be superimposed on or combined with the template.

6. An information receiving method as claimed in claim 4, wherein the step of obtaining coordinate data corresponding to the received DTMF signal comprises the step of converting the coordinate data into two-dimensional coordinates.

7. An information receiving method as claimed in claim 5, wherein the step of obtaining coordinate data corresponding to the received DTMF signal includes a step of identity mapping.

8. An information receiving apparatus comprising receiving means for receiving a DTMF signal over a telephone line, converting means for obtaining coordinate data corresponding to the received DTMF signal, and displaying means with templates for displaying a predetermined figure in a position based on the coordinate data, said position being on a pre-stored template, said predetermined figure being displayed so as to be superimposed on or combined with the template.

9. An information receiving apparatus as claimed in claim 8, further comprising television receiving means for receiving a television broadcast and television displaying means for displaying the received television broadcast, wherein said displaying means with templates displays the predetermined figure so as to be superimposed on or instead of or in addition to the television broadcast displayed on the television displaying means.

10. An information receiving method comprising the steps of selecting a template from among a plurality of pre-stored templates after the template has been specified, receiving a DTMF signal over a telephone line, obtaining coordinate data corresponding to the received DTMF signal, and displaying a predetermined figure in a position based on the coordinate data, said position being on the selected template, and said predetermined figure being displayed so as to be superimposed on or combined with the template.

11. An information receiving method as claimed in claim 10, wherein the step of obtaining coordinate data corresponding to the received DTMF signal includes a step of identity mapping.

12. An information receiving apparatus comprising inputting means for accepting specification of a template by a user, selecting means for, when the inputting means accepts a specification by a user, selecting the template from among a plurality of pre-stored templates based on the specification, receiving means for receiving a DTMF signal over a telephone line, converting means for obtaining coordinate data corresponding to the received DTMF signal, and displaying means with templates for displaying a predetermined figure in a position based on the coordinate data, said position being on the selected template, said predetermined figure being displayed so as to be superimposed on or combined with the template.

13. An information receiving method comprising the steps of receiving a DTMF signal over a telephone line, extracting a number specifying a template from a predetermined part of the received DTMF signal, retrieving the template from among a plurality of pre-stored templates based on the number, obtaining coordinate data corresponding to another part of the DTMF signal, and displaying a predetermined figure in a position based on the coordinate data, said position being on the retrieved template, and said predetermined figure being displayed so as to be superimposed on or combined with the template.

14. An information receiving method as claimed in claim 13, wherein the step of obtaining coordinate data corresponding to the received DTMF signal includes a step of identity mapping.

15. An information receiving apparatus comprising receiving means for receiving a DTMF signal over a telephone line, template number extracting means for extracting a number specifying a template from a predetermined part of the received DTMF signal, reception retrieving means for retrieving the template from among a plurality of pre-stored templates based on the number, coordinate extracting means for obtaining coordinate data corresponding to another part of the DTMF signal, and displaying means with templates for displaying a predetermined figure in a position based on the coordinate data, said position being on the retrieved template, said predetermined figure being displayed so as to be superimposed on or combined with the template.

16. An information receiving apparatus as claimed in claim 15, wherein said coordinate extracting means obtains the coordinate data corresponding to the DTMF signal by use of an identity mapping.

17. An information receiving apparatus as claimed in claim 15, wherein in obtaining the coordinate data corresponding to the DTMF signal, said coordinate extracting means converts the coordinate data into two-dimensional coordinates.

* * * * *